July 22, 1952 C. H. L. WYNNE 2,604,149
SUPPLY OF FUEL TO GAS TURBINE ENGINES
Filed Oct. 25, 1948 2 SHEETS—SHEET 1
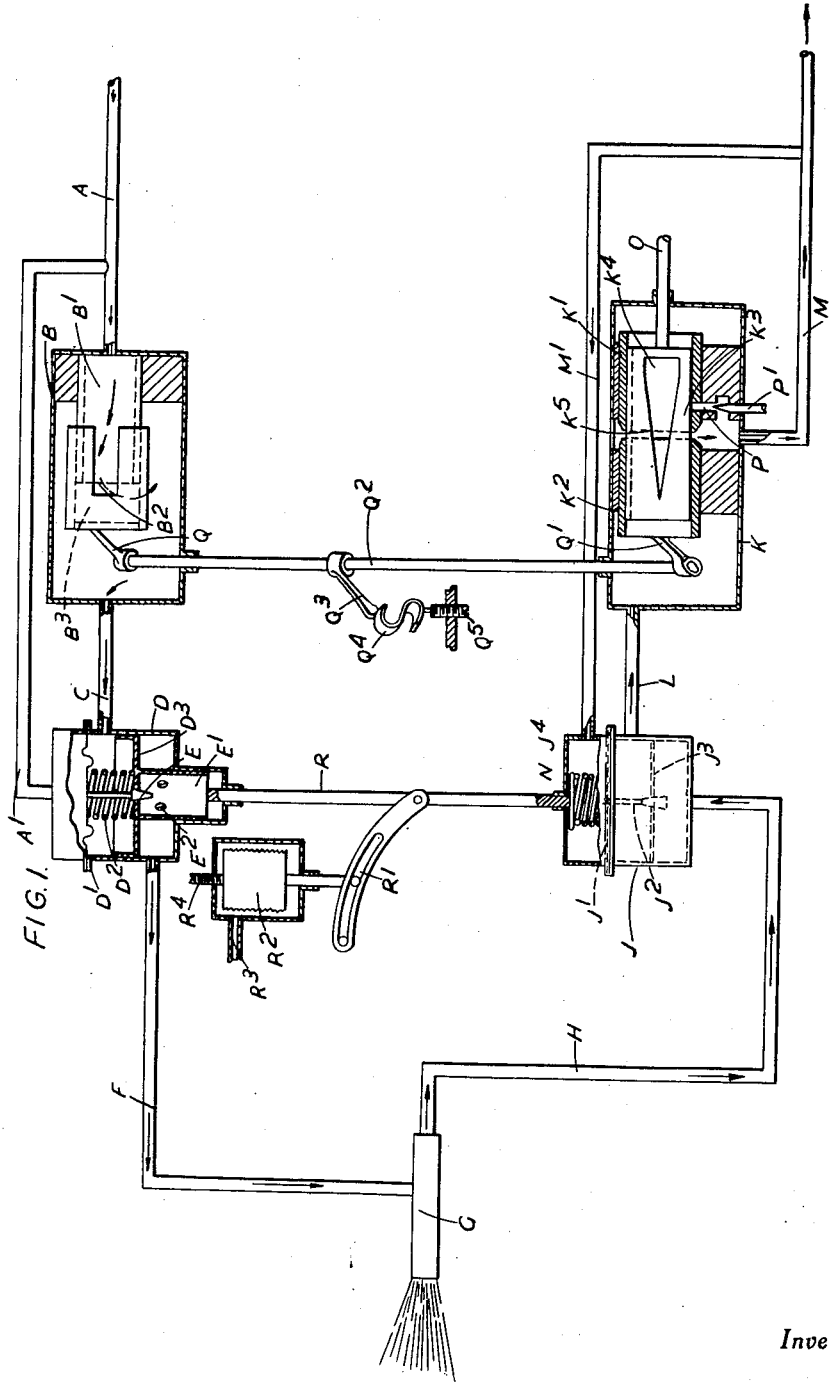
Inventor
Charles H. L. Wynne
By Emery, Holcombe & Blair
Attorneys

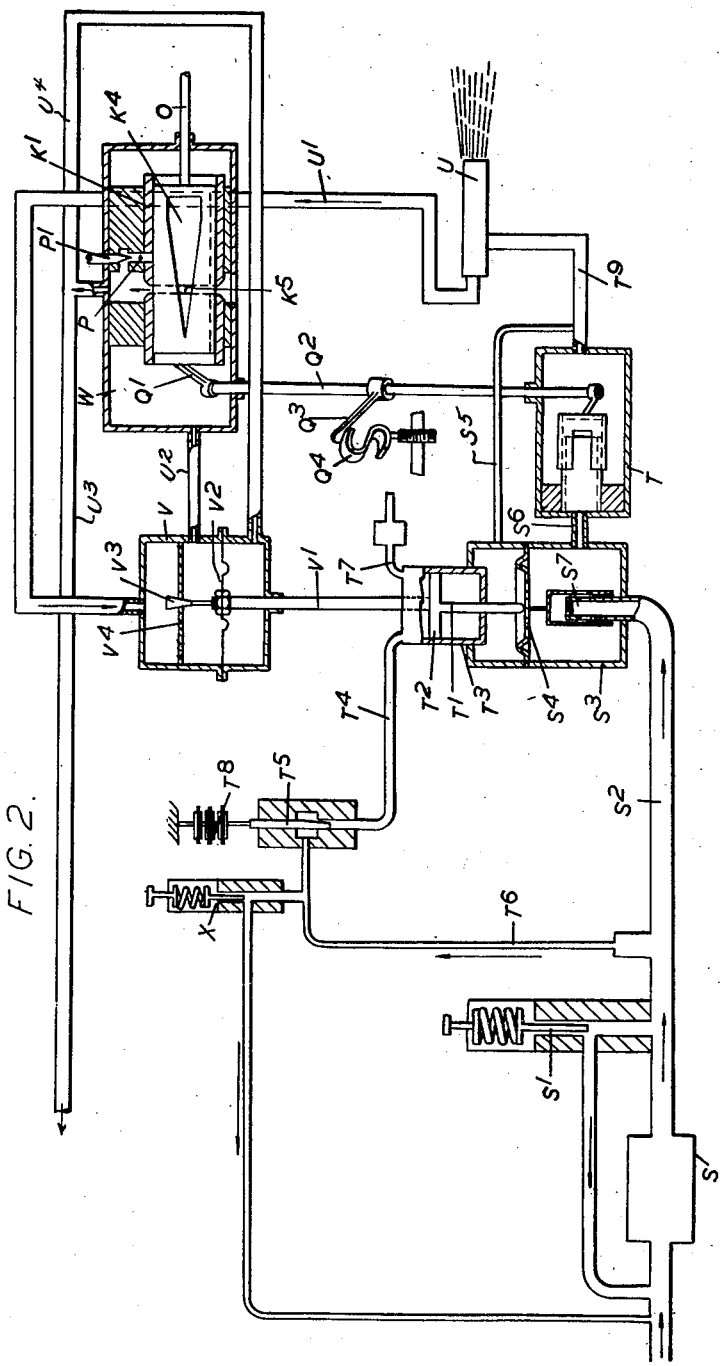

Patented July 22, 1952

2,604,149

UNITED STATES PATENT OFFICE 2,604,149

SUPPLY OF FUEL TO GAS TURBINE ENGINES

Charles Horace Lionel Wynne, London, England, assignor to D. Napier & Son Limited, London, England, a company of Great Britain Application October 25, 1948, Serial No. 56,301
In Great Britain October 20, 1947

11 Claims. (Cl. 158—36)

This invention relates to apparatus for supplying fuel to the combustion chamber or chambers of gas turbine engines of the kind in which the fuel is delivered through one or more burners of the spill type, that is to say a burner of the kind comprising a swirl or turbulence chamber to which fuel in excess of that to be injected is delivered and from which leads on the one hand one or more injection openings and on the other hand a spill tube or passage, the flow through the spill tube (hereinafter called the spill flow), which represents that portion of the total fuel delivered which is not injected into the combustion chamber, being controlled to control the quantity of fuel injected. It is generally considered that a burner of the spill type is preferable for use with gas turbine engines to a burner of the type in which all the fuel delivered to the burner is injected, in that a burner of the spill type tends to give improved atomisation with lower fuel pressures and particularly when the quantity of fuel injected is comparatively small, since a high degree of swirl or turbulence in the swirl chamber can be maintained at all times irrespective of the quantity of fuel actually delivered through the delivery orifice or orifices.

The present invention has for its object to provide improved apparatus which will tend to overcome certain disadvantages associated with the known apparatus in which the fuel is delivered at a substantially constant rate by a constant delivery pump, the flow through the spill tube similarly takes place at a substantially constant rate and variations in the quantity of fuel injected are effected by supplying additional fuel from a variable stroke pump to the burner.

Apparatus according to the present invention for supplying fuel to the combustion chamber or chambers of a gas turbine comprises one or more burners of the spill type, means for delivering fuel continuously and preferably at constant pressure, means for metering the fuel supply from the constant delivery source to the burner or burners, and means for simultaneously metering the spill flow from the burner or burners.

In a convenient arrangement the fuel passes to the burner from a constant pressure source through a metering orifice the pressure difference across which is maintained constant for constant conditions but is varied automatically in accordance with variations in one of the variable conditions on which depend the quantity of fuel required to be delivered by the burner, for example the air temperature or air pressure in the air intake, while the spill flow takes place through an orifice the pressure difference across which is also controlled automatically in accordance with variations in the same variable condition, whereas its cross-sectional area is capable of being caried by a speed setting device.

Further the cross-sectional area of the metering orifices through which respectively fuel is supplied to the burner and the spill flow passes, may be varied automatically in accordance with variations in another one of the variable conditions on which depend the quantity of fuel required to be delivered by the burner.

Thus in one arrangement according to the invention the pressure difference across each of the metering orifices is varied simultaneously in accordance with variations in the air pressure in the air intake, that is to say in the so-called "ram," while the cross-sectional areas of the two metering orifices are influenced simultaneously by the temperature of the air, the cross-sectional area of the spill flow metering orifice also being controlled by a speed setting device.

In any case the control of the pressure drop across the metering orifices may be effected by varying the effective force of a spring acting on the low pressure side of a diaphragm the opposite sides of which are subject to the pressures on the two sides of the metering orifice, or by varying the hydraulic pressure on a member which acts upon a diaphragm the two sides of which are subject respectively to the pressures on the two sides of the metering orifice.

The invention may be carried into practice in various ways but two constructions according to the invention are illustrated diagrammatically by way of example in the accompanying drawings, in which Figure 1 is a diagrammatic illustration of one construction according to the invention, and Figure 2 is a similar view to Figure 1 of a modified construction according to the invention.

In the construction illustrated in Figure 1 the apparatus comprises a main supply pipe A through which fuel is delivered continuously and at constant pressure by a pump in known manner, the pump being for example of the gear wheel type and being provided with a relief valve which is set to open at the constant pressure which is to be maintained. The pipe A delivers fuel to a metering orifice device generally designated by the reference letter B and comprising an inner member $B^1$ of hollow tubular form into which the fuel is delivered and from which it escapes through a metering orifice formed by a slot $B^2$ in an outer member $B^3$ which has a close working fit with the member $B^1$ and is movable axially relatively to it so as to vary the effective area of the slot $B^2$ which constitutes the actual metering orifice. Fuel flowing through the orifice $B^2$ passes through a pipe C to a device D by which the pressure difference across the orifice $B^2$ can be maintained and controlled.

The device D comprises a chamber across which extends a resilient flexible diaphragm $D^1$ the upper face of which is subject to the constant pressure in the pipe A through a pipe $A^1$ while its under surface is subject to the pressure in the pipe C which opens into the chamber below the diaphragm. Thus the two faces of the diaphragm are subject respectively to the pressures on the two sides of the orifice $B^2$. The under face of the diaphragm is also subject to the pressure of one end of a spring $D^2$ the other end of which bears upon a movable piston member $D^3$ which makes a fluid-tight seal with the wall of the device D and contains at its centre an orifice controlled by a valve E of tapered form secured to the diaphragm $D^1$. The orifice controlled by the valve E opens into the chamber below the piston $D_3$ from which the fuel can flow freely by a pipe F to the spill type burner G. In the arrangement shown the orifice controlled by the valve opens into a cylindrical member $E_1$ provided with apertures $E_2$ in its wall and serving as an additional guide for the piston $D_3$.

The spill flow from the spill type burner G passes through a pipe H to a pressure-drop-control device J somewhat similar to the device D and serving to control and maintain an appropriate pressure drop across the orifice of a second metering orifice device generally designated by the reference letter K to which the fuel flows from the device J through a pipe L and from which it flows through a pipe M to the fuel reservoir or inlet side of the pump.

The device J comprises a chamber across which extends a resilient flexible diaphragm $J^1$ the space above which is connected to the pipe M by a pipe $M^1$ while the space below it communicates with the pipe L so that the two faces of the diaphragm are subject respectively to the fuel pressures on the two sides of the metering device K. Also secured to the diaphragm $J^1$ is a control valve $J^2$ controlling an orifice in a transverse partition $J^3$ extending across the chamber J between the point where the pipe H enters this chamber and the point where the pipe L leaves the chamber. The diaphragm $J^1$ is also subject to the action of a compression spring $J^4$ one end of which bears upon the upper face of the diaphragm while its other end bears upon an adjustable thrust member N.

The metering device K comprises a chamber containing a fixed sleeve $K^1$ and an axially movable sleeve $K^2$ spaced from but coaxial therewith, the two sleeves together forming a housing in which slides a slotted tubular valve member $K^3$ having a tapered slot $K^4$ therein so as to provide a metering orifice $K^5$ at the point at which this slot traverses the gap between the adjacent ends of the sleeves $K^1$ and $K^2$. The righthand end of the valve member $K^3$ is closed and connected to a rod O by which the valve member can be moved longitudinally to vary the point at which the tapered slot $K^4$ traverses the gap between the sleeves $K^1$ and $K^2$, thus varying the rate of fuel flow through the metering orifice device K.

In addition a slot P is provided in the fixed sleeve $K^1$ the effective cross-sectional area of which is controllable by a needle valve $P^1$, the slot P being disposed so that the slot $K^4$ will come into communication with it towards the end of the travel of the valve member $K^3$ to the left in Figure 1, that is to say in the direction to increase the flow through the metering orifice device and hence reduce the quantity of fuel delivered by the burner G. By adjustment of the needle valve $P^1$ therefore the quantity of fuel actually delivered by the burner, under minimum delivery, or "slow-running" conditions, can be adjusted.

The movable sleeves $B^3$ and $K^2$ are connected to levers Q and $Q^1$ on opposite ends of a shaft $Q^2$ carrying a third lever $Q^3$ acted upon by mechanism responsive to air temperature in the air intake, this mechanism being diagrammatically illustrated as a Bourdon tube device $Q^4$ having associated with it a setting screw $Q^5$. Thus the settings of the sleeves $B^3$ and $K^2$ and hence the cross-sectional areas of the metering slots $B^2$ and $K^5$ are automatically controlled in accordance with variations in the air temperature.

The piston device $D^3$, $E^1$ and the thrust member N are connected to opposite ends of a rod R connected by a square law slotted cam device $R^1$ to a pressure-responsive capsule $R^2$ subject to the pressure in the air intake, i. e. to the so-called "ram," through a pipe $R^3$, this capsule having associated with it a setting screw $R^4$.

The operation of the apparatus is as follows. Assuming the pressure in the air intake and the temperature to remain constant, the effective force of the springs $D^2$ and $J^4$ on the diaphragms $D^1$ and $J^1$ and the positions of the sleeves $B^3$ and $K^2$ will remain unaltered. The cross-tional area of the metering slot $B^2$ and the pressure drop maintained across it by the device D, which pressure drop is determined by the effective force of the spring $D^2$, will thus remain constant so that the flow through the slot $B^2$ and hence to the spill type burner G will remain constant. Similarly if the member O remains stationary the cross-sectional area of the slot $K^5$ and the pressure drop across it maintained by the device J, which pressure drop is determined by the effective force of the spring $J^4$ on the diaphragm, will remain constant so that the spill flow from the burner G will remain constant. Hence the quantity of fuel delivered by the burner will remain constant.

If then without change of "ram" or air temperature the member O is moved, the cross-sectional area of the slot $K^5$ will be varied so as to vary the spill flow and hence the quantity of fuel delivered by the burner according to the engine speed desired.

Any change in "ram" results in movement of the rod R through the cam device $R^1$ by the capsule $R^2$ to vary simultaneously the effective forces of the springs $D^2$ and $J^4$ so as simultaneously to vary in like manner the pressure drops respectively across the metering slots $B^2$ and $K^5$ and thereby to control both the quantity of fuel delivered to the spill type burner G and the spill flow through the pipe H from that burner to ensure a variation in the quantity of fuel delivered by the burner in accordance with and in proper proportion to the variation in "ram."

Further, any change in the air temperature results in movement of the shaft $Q^2$ by the temperature-responsive device $Q^4$ so as to open or close simultaneously the slots $B^2$ and $B^5$ and thus to vary both the quantity of fuel which flows to the burner G and the spill flow from the burner G in such a manner as to vary the quantity of fuel delivered by the burner G appropriately in accordance with air temperature variations.

It will be seen from the above that in the arrangement shown in Figure 1 the pressure drop across each of the orifices $B^2$ and $K^5$ is a function of the effective force of the springs $D^2$ and $J^4$. Thus, compression or expansion of these springs at any given setting to maintain this pressure drop by appropriate movement of the valves E and $J^2$ will be accompanied by small variations in the effective force of the springs, these variations depending upon the "rating" of the springs, while moreover the movement of the rod R must be related to the rating of the springs. The modification shown in Figure 2 aims at providing an improved arrangement in which springs are eliminated.

In the construction diagrammatically illustrated in Figure 2 the apparatus comprises a pump S for supplying fuel continuously at constant pressure, this constant pressure being maintained by providing an automatic relief valve $S^1$ of known type. The pump S delivers the fuel to a passage $S^2$ through which it flows through a device $S^3$ for maintaining a constant difference of pressure on the two sides of a metering orifice device T to which the fuel flows from the device $S^3$. The device $S^3$ consists of a chamber across which extends a flexible diaphragm $S^4$ one surface of which is subject through a passage $S^5$ to the pressure on the outlet side of the metering orifice device T while its other surface is subject to the pressure on the inlet side of the metering orifice device T through a passage $S^6$ through which fuel flows to the inlet side of the metering orifice device T from the pipe $S^2$ by way of a valve $S^7$ the opening of which is controlled by the diaphragm $S^4$ in a manner generally similar to the control of the valve E by the diaphragm $D^1$ in the construction shown in Figure 1. A member $T^1$ controlling the pressure difference maintained by the device $S^3$ across the metering orifice T exerts a pressure on the low pressure side of the diaphragm $S^4$, this member performing the function of the spring $D^2$ in the construction shown in Figure 1 but, instead of being spring-operated, comprising a piston $T^2$ operating in a cylinder $T^3$ and having its upper surface acted upon by hydraulic pressure. In order to maintain and control this hydraulic pressure the upper end of the cylinder $T^3$ is connected by an inlet passage $T^4$ through a valve $T^5$ and a passage $T^6$ to the constant fluid pressure passage $S^2$ and thence through a passage $T^7$ and a fixed calibrated outlet orifice back to the fuel supply. The valve $T^5$ is controlled by a capsule $T^8$ subject to the air pressure in the air inlet so that the opening of the valve $T^5$ depends upon this air pressure. The valve $T^5$ and the capsule $T^8$ are so calibrated in relation to the cross-sectional area of the fixed calibrated outlet orifice in the pipe $T^7$ that the opening and closing of the valve $T^5$ by increases and decreases in the air inlet pressure produces corresponding increases and decreases in the pressure in the upper end of the cylinder $T^3$ acting on the piston $T^2$ in accordance with the relative proportions of the several cooperating parts so as to provide the required variations in the force applied by the member $T^1$ to the diaphragms and hence in the pressure drop across the orifice device T. The orifice device T is similar in construction and operation to the device B in Figure 1 and the fuel flowing therethrough passes by a pipe $T^9$ to the spill type burner U from which the spill flow takes place through a pipe $U^1$ and a pressure-drop control device V and pipe $U^2$ to a metering orifice device W the pressure drop across which is controlled by the device V and the flow through which thus represents the spill flow, which returns through a pipe $U^3$ to the fuel supply or to the inlet side of the pump S. The device W corresponds in construction and operation to the device K in Figure 1 and includes a rod O connected to a speed-setting device. In the construction shown in Figure 2 the pressure drop control device V differs from the corresponding pressure drop control device J of the construction shown in Figure 1 in that the pressure difference maintained by the device is controlled and regulated not by the pressure of a spring but by the device $T^2$ subject to hydraulic pressure in the manner described above. To this end the device $T^2$ is connected by a tension rod $V^1$ to the diaphragm $V^2$ separating two axially disposed chambers of the device V, one of which chambers is in communication with the pipe $U^2$ and the other is in communication through a pipe $U^4$ with the spill flow return pipe $U^3$. The diaphragm $V^2$ is connected in known manner to a valve $V^3$ controlling an orifice in a transverse partition $V^4$ the effective cross-sectional area of which is automatically varied by the diaphragm to maintain the appropriate pressure difference across the metering orifice device W in accordance with the force applied to the diaphragm $V^2$ by the tension rod $V^1$.

It will thus be seen that the operation of the apparatus shown in Figure 2 is substantially the same as that shown in Figure 1 except that the variations in pressure drop across the metering orifice devices respectively controlling the flow of fuel to and from the spill type burner are effected by variations in the hydraulic pressure acting on the piston $T^2$ which in turn result from movement of the valve $T^5$ by the capsule $T^8$ under variations in the air pressure or "ram" in the inlet passage.

If desired a secondary relief valve X may be provided in the pipe $T^6$ to ensure that the pressure at which fuel passes the valve $T^5$ is maintained constant in spite of any small pressure drop which may occur in the pipe $T^6$ between the valve $T^5$ and the valve $S^1$.

What I claim as my invention and desire to secure by Letters Patent is:

1. Apparatus for supplying fuel from a suitable source to the combustion chamber or chambers of a gas turbine comprising one or more burners of the spill type, means for delivering fuel at constant pressure, means including a first metering orifice through which the fuel is supplied from the constant pressure delivering means to the burner or burners, and means including a second metering orifice for simultaneously metering the spill flow from the burner or burners, in combination with means associated with the supply to said first fuel metering orifice for maintaining a constant pressure difference across said first metering orifice for constant conditions and for varying such pressure difference in accordance with variations in said conditions produced by a controlling variable, and means associated with the spill flow for maintaining a constant pressure difference across the second metering orifice for constant conditions and for varying such pressure difference in accordance with variations in said conditions produced by the same controlling variable.

2. Apparatus for supplying fuel to the combustion chamber or chambers of a gas turbine as claimed in claim 1 including means for varying the cross-sectional area of the first metering orifice in accordance with conditions produced by a controlling variable, and means for simultaneously varying the cross-sectional area of the second metering orifice in accordance with conditions produced by the same controlling variable.

3. Apparatus for supplying fuel to the combustion chamber or chambers of a gas turbine as claimed in claim 2, in which the means for varying the pressure difference across each of the metering orifices comprises a device responsive to the pressure of air supplied to the turbine and the means for varying the cross-sectional area of the two metering orifices includes a device responsive to the temperature of air delivered to the turbine.

4. Apparatus for supplying fuel from a suitable source to a combustion chamber of a gas turbine comprising at least one burner of the spill type, said apparatus including means for delivering fuel at constant pressure and a conduit between said pressure means and a burner, a spill return conduit from said burner to the fuel supply, metering means in said fuel delivering conduit comprising a first metering orifice through which the fuel is supplied from the constant pressure source to said burner, means in said spill return conduit including a second metering orifice controlling the spill flow from said burner, means responsive to variations in the physical condition of the air supplied to the turbine for varying the pressure difference across the first and second metering orifices, and means for controlling the cross-sectional area of one of said metering orifices at will.

5. Apparatus for supplying fuel to a combustion chamber of a gas turbine as claimed in claim 4 including means responsive to variations in the physical condition of the air supplied to the turbine for varying the cross-sectional areas of the first and second metering orifices.

6. Apparatus for supplying fuel to the combustion chamber or chambers of a gas turbine as claimed in claim 1 including means for varying the cross-sectional area of the second metering orifice in accordance with conditions produced by another controlling variable.

7. Apparatus for supplying fuel to the combustion chamber or chambers of a gas turbine as claimed in claim 1 including a device responsive to the pressure of air delivered to the turbine for controlling the pressure difference across said metering orifices.

8. Apparatus for supplying fuel from a suitable source to the combustion chamber or chambers of a gas turbine comprising one or more burners of the spill type, said apparatus including means for delivering fuel from said source at constant pressure and a conduit between said fuel delivering means and a burner, a spill return conduit from said burner for supplying fuel thereto to the fuel supply, means in said burner supplying conduit including a first adjustable metering orifice through which the fuel is supplied from the constant pressure fuel delivering means to the burner or burners, and means in said return conduit including a second adjustable metering orifice for simultaneously metering the spill flow from the burner or burners; in combination with means connecting said metering orifices for adjusting them in correlation.

9. Apparatus for supplying fuel to the combustion chamber or chambers of a gas turbine as claimed in claim 8 including a device responsive to air temperature for controlling the means for adjusting said metering orifices.

10. Apparatus for supplying fuel to the combustion chamber or chambers of a gas turbine as claimed in claim 4 including a device responsive to air temperature for varying the cross-sectional areas of the first and second metering orifices.

11. Apparatus for supplying fuel to a combustion chamber of a gas turbine comprising at least one burner of the spill flow type, means for delivering fuel at a substantially constant pressure, a supply passage between the constant pressure supply means and said burner, first metering orifice apparatus in said supply passage including a first adjustable metering orifice the flow through which takes place by reason of a pressure drop across the orifice and means responsive to the pressure respectively on the two sides of the orifice controlling said pressure drop, a spill flow passage leading from said burner through which the spill flow therefrom flows, a second metering orifice apparatus in said spill flow passage including a second adjustable metering orifice through which flow takes place by reason of a pressure drop across the orifice and means responsive to the pressure respectively on the two sides of the orifice for controlling said pressure drop, and means for simultaneously controlling the flow through the said first and second metering orifice apparatus including means for adjusting the two orifices in correlation.

CHARLES HORACE LIONEL WYNNE.

REFERENCES CITED

The following references are of record in the file of this patent:

UNITED STATES PATENTS

| Number | Name | Date |
|---|---|---|
| 1,628,424 | Peabody | May 10, 1927 |
| 1,824,952 | Graham et al. | Sept. 29, 1931 |
| 2,334,679 | Mason | Nov. 16, 1943 |
| 2,440,566 | Armstrong | Apr. 27, 1948 |

FOREIGN PATENTS

| Number | Country | Date |
|---|---|---|
| 918,129 | France | Oct. 7, 1946 |